United States Patent [19]

Quigley

[11] Patent Number: 5,408,956
[45] Date of Patent: Apr. 25, 1995

[54] METHOD AND APPARATUS FOR CONTROLLING ANIMALS WITH ELECTRONIC FENCING

[75] Inventor: Thomas M. Quigley, La Grande, Oreg.

[73] Assignee: The United States of America as represented by the Secretary of Agriculture, Washington, D.C.

[21] Appl. No.: 78,341

[22] Filed: Jun. 21, 1993

[51] Int. Cl.⁶ .................. A01K 15/04; A01K 3/00
[52] U.S. Cl. .................... 119/720; 119/908
[58] Field of Search ........... 119/718, 719, 720, 721, 119/908; 40/301, 302

[56] References Cited

U.S. PATENT DOCUMENTS

| Re. 31,632 | 7/1984 | Murphy et al. | 40/301 |
|---|---|---|---|
| 700,483 | 5/1902 | Emeis . | |
| 834,587 | 10/1906 | Moyer . | |
| 1,188,910 | 6/1916 | Derrett . | |
| 1,318,909 | 10/1919 | Patterson . | |
| 1,347,868 | 7/1920 | Nichols . | |
| 1,376,223 | 4/1921 | Pannier . | |
| 2,653,400 | 9/1953 | Sutherland . | |
| 2,972,828 | 2/1961 | Dumbrell | 40/302 |
| 3,346,980 | 10/1967 | Wallace | 40/302 |
| 3,357,122 | 12/1967 | Hayes | 40/301 |
| 3,388,492 | 6/1968 | Nichols, Jr. | 40/301 |
| 3,505,752 | 4/1970 | Beattie | 40/302 |
| 3,731,414 | 5/1973 | Murphy et al. | 40/301 |
| 3,949,708 | 5/1976 | Meeks | 119/156 |
| 4,060,921 | 12/1977 | Robinson | 40/301 |
| 4,202,293 | 5/1980 | Gonda et al. . | |
| 4,250,643 | 2/1981 | Mackenzie | 40/301 |
| 4,335,682 | 6/1982 | Gonda et al. . | |
| 4,359,015 | 11/1982 | Ritchey | 40/301 X |
| 4,425,726 | 1/1984 | Dvorak | 40/301 |
| 4,425,874 | 1/1984 | Child | 40/301 X |
| 4,506,630 | 5/1985 | Hair | 119/156 |
| 4,581,834 | 4/1986 | Zatkos et al. | 40/301 |
| 4,694,781 | 4/1987 | Howe et al. | 119/156 |
| 4,741,117 | 5/1988 | Fearing | 40/301 |
| 4,791,402 | 12/1988 | Gonda et al. | 343/895 |
| 4,811,775 | 3/1989 | Sun | 70/16 |
| 4,878,302 | 11/1989 | Jowsey | 40/302 |
| 4,885,855 | 12/1989 | Marks, Sr. et al. | 40/301 |

(List continued on next page.)

FOREIGN PATENT DOCUMENTS 2188028 9/1987 United Kingdom ............... 40/301

OTHER PUBLICATIONS

Fee, Rod, "No Posts, No Wires Electronic Fence," Successful Farming, Mid-Mar., 1993.

(List continued on next page.)

*Primary Examiner*—Robert P. Swiatek
*Attorney, Agent, or Firm*—M. Howard Silverstein; John D. Fado; Janet I. Stockhausen

[57] ABSTRACT

An electronic fence is utilized to control animal access as an alternative to conventional posts and barbed wire fences. The electronic fencing includes stationary field transmitters with variable ranges placed around the perimeter of an accessible area. Each animal in the area wears a small ear tag receiver. When an animal enters an exclusion zone, the receiver triggers an audible tone, and then shortly thereafter an electrical stimulus. The audible tones and electrical stimuli may be repeated three more times at four second intervals until the animal exits the exclusion zone. If the animal hasn't responded, a safety device in the ear tag locks up or disables the unit to prevent the animal from receiving further stimuli. A remote stationary unlock transmitter located in areas frequented by the animals, such as salt licks, mineral or water sources, unlocks any ear tags which have become locked and thus improves the integrity of the system. The ear tag may also be locked by a portable hand held transmitter without stimulation to the animal. The hand held transmitter may also be utilized to unlock the ear tags and to test the system by providing an electronic stimulus to the animal for the purpose of moving selected animals through the exclusion zone when desired.

14 Claims, 3 Drawing Sheets

U.S. PATENT DOCUMENTS

| | | |
|---|---|---|
| 4,898,120 | 2/1990 | Brose .............................. 340/573 X |
| 4,947,795 | 8/1990 | Farkas . |
| 5,028,918 | 7/1991 | Giles et al. .................... 119/51.02 X |
| 5,067,441 | 11/1991 | Weinstein ....................... 340/573 X |
| 5,121,711 | 1/1992 | Aine ................................. 119/15 X |
| 5,241,923 | 9/1993 | Janning .......................... 340/573 X |

OTHER PUBLICATIONS

Wiggen, Regina, "Keep those Cows and Cars Moving Along," Agricultural Research, Jan. 1991.

Weibye, Gheryl, "Tuning in to Livestock Control," Hay & Forage Grower, Nov. 1990.

Quigley, Thomas M. et. al., "Livestock Control with Electrical and Audio Stimulation," Rangelands 12(3), Jun. 1990, pp. 152–155.

Quigley, Thomas M. et. al., "Electronic Livestock Control: An Alternative to Fencing," Abstract from proceedings of the . . . Feb. 1990, #111.

Quigley, Thomas M. et. al., "Electronic Control of Livestock in Riparian Areas," Abst. from Proceedings of the . . . Jul. 1991, p. 15.

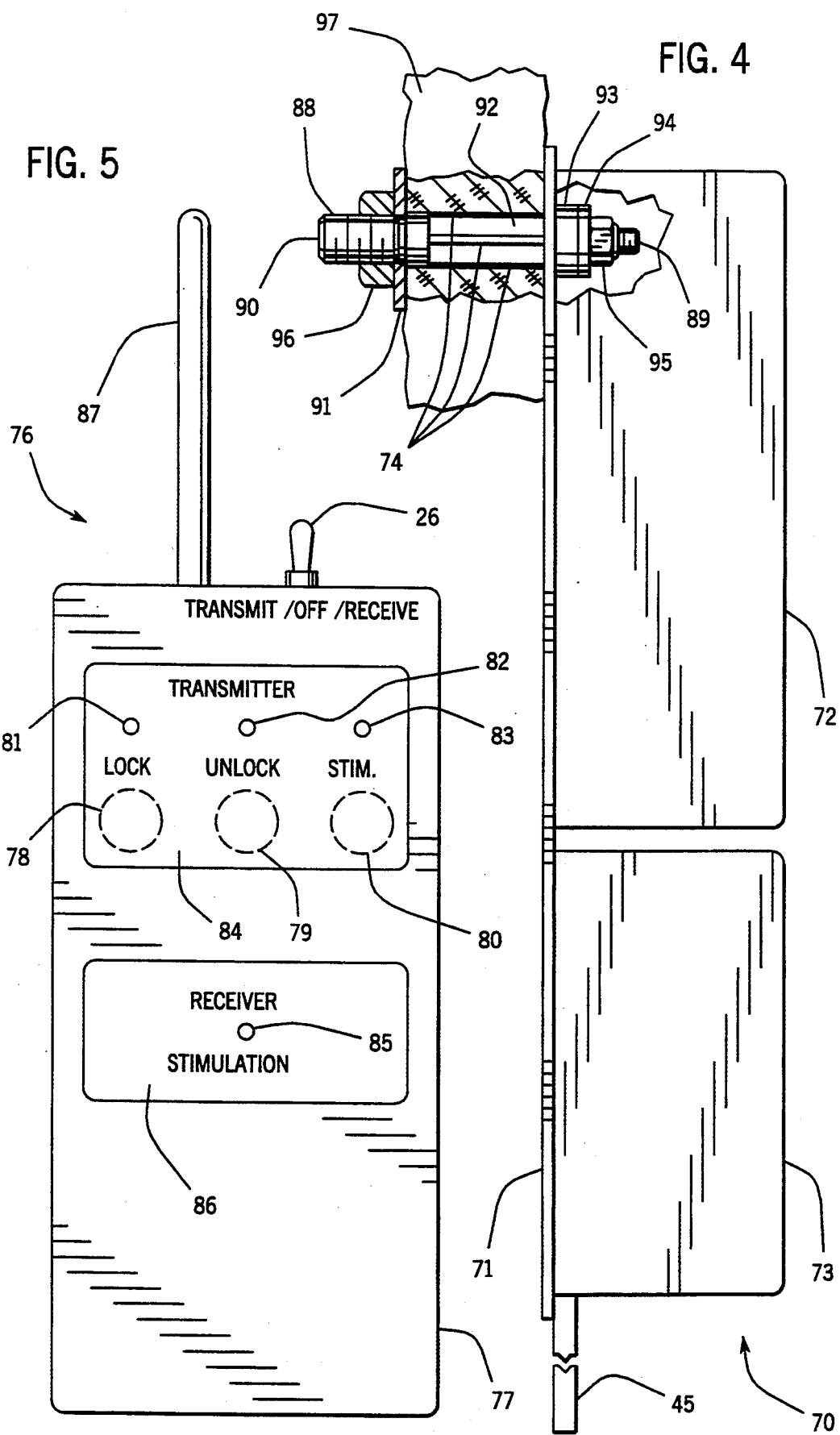

METHOD AND APPARATUS FOR CONTROLLING ANIMALS WITH ELECTRONIC FENCING

BACKGROUND AND SUMMARY OF THE INVENTION

The present invention relates to fenceless control of animals, and more particularly, to a method of controlling livestock utilizing an electronic fence for sequentially applying an audio and electric stimuli to livestock.

Livestock such as cows, sheep, pigs, goats and horses are currently primarily controlled by ordinary barbed wire fencing. However, drawbacks to wire fencing are that it is expensive to install and expensive to maintain, as well as having undesirable aesthetic and ecological considerations. Therefore, it has been proposed to utilize remote wireless transmitters with a receiver attached to the animal for administering control stimuli to the animal as a substitute for ordinary wire fencing.

Adverse impacts of grazing animals on soils, vegetation, and water quality in riparian areas is a serious land management problem. There is a direct relationship between intensity of grazing in riparian zones and bacterial water quality. Similarly, sediment, turbidity, and water temperature can be adversely affected by grazing in riparian zones. Exclusion of livestock from riparian areas is the initial step being recommended to address the adverse impacts of grazing in riparian zones. To this end, corridor fencing of problem areas has been implemented in many places to keep animals from the stream. Although this has been shown to be an effective solution to the problem, there are many drawbacks to wire fencing that calls for a different approach to solving the problem. As noted above, corridor fences are expensive to construct, costly to maintain, and may be aesthetically unpleasing. Also, corridor fencing forces ranchers managing the livestock to seek alternative, sometimes more costly, ways to provide water to grazing animals. In addition, herding can be used effectively to manage livestock in riparian areas but this approach is labor intensive and costs prohibit broad application. Thus, both of these alternatives have the potential to create severe economic problems for the livestock industry.

Accordingly, a new management alternative to fencing for controlling livestock grazing, especially in riparian areas, has been developed. This approach involves fenceless livestock control that uses audio warning and electrical stimulus to achieve animal avoidance of desired exclusion areas, such as riparian zones. The basic concept of the technology is that livestock can be trained to respond to audio warning and electrical stimulation provided to the ear of an animal as it enters the zone of influence of a signal from a field transmitter installed in the area of desired exclusion. The field transmitter emits a continuous, coded signal of designated strength that narrowly defines an area from which animals are to be excluded. Animals grazing in the area wear an electronic ear tag containing a receiver, an audio warning emitter, and a device to produce a small electrical stimulus to the ear. If the animal ventures within the prescribed exclusion zone, i.e. within the area of influence of the field transmitter, the signal is detected by the receiver in the ear tag worn by the animal. The signal activates an audio/electrical stimulation sequence. The sequence consists of the modules in the ear tag providing in an audio warning followed by a pause and then an electrical stimulation to the ear of the animal. If the animal exits the exclusion zone and moves back into the grazing zone at any time during the sequence, no further stimuli are received and the sequence is terminated. However, if the animal remains within range of the field transmitter or continues to proceed toward the field transmitter, the signal from the transmitter is again received and the animal is provided with another audio/electrical stimulation sequence. Thus, if the animal exits the range of the field transmitter following any audio and/or electrical stimulation, no further stimuli are provided to the animal until it again enters the range of the field transmitter. A built-in safety device locks up the ear tag, i.e. prevents continued audio/electrical stimulus, after a predetermined number of audio/electrical stimuli cycles are received should the animal become disoriented or if the mechanism malfunctions. The ear tag may then be reactivated by an unlock transmitter which may be placed at a remote watering/salt/mineral facility or which may be contained within a portable hand held transmitter. The hand held unit enables a user to lock, unlock and stimulate ear tags as well as to test the signals emitting from the field and unlock transmitters.

The variable strength transmitter is designed to provide a continuous coded signal. Signal strength may be varied by a set of attenuators to provide precise control of field strength, typically from about 100 to about 500 feet from the field transmitter. Thus, the size of the desired exclusion area can be varied by modifying the signal strength. Multiple settings on a single transmitter provide flexibility in field applications. Each field transmitter transmits a digital stimulation code which must be compatible with the particular ear tag receiver or else no stimulation of the animal occurs. The transmission of the digital stimulation code is also randomized so that the likelihood of two transmitters interfering by transmitting at the same time, either on the same or different properties, is minimized.

The ear tag includes a flat base for mounting the receiver circuitry. The audio warning sound is provided by an emitter mounted near the top of the tag to provide closest proximity to the ear canal of the animal. Electrical stimulus is provided by electrodes that are integral with the ear tag mounting post such that at least two electrodes are in constant contact with the ear.

The stationary unlock transmitter is typically remotely placed near a watering/salt/mineral facility and is utilized to automatically unlock the ear tags of animals as they return to water or salt/mineral areas. This effectively creates an unlock zone so that if an animal had entered the exclusion zone and received the full set of audio/electrical stimuli sequences, the ear tag would be locked up and the animal would be free to graze at will. The purpose of the unlock transmitter is to reactivate those ear tags so that the animal cannot proceed again into the exclusion zone without again receiving the audio/electrical stimuli sequences.

BRIEF DESCRIPTION OF THE DRAWINGS

The drawings illustrate the best mode presently contemplated of carrying out the invention.

In the drawings:

FIG. 4 is a side view in elevation of the ear tag receiver for mounting the receiver of FIG. 3; and FIG. 5 is a front view in elevation of a portable hand held transmitter/receiver unit.

DESCRIPTION OF THE PREFERRED EMBODIMENT

Figure 1:
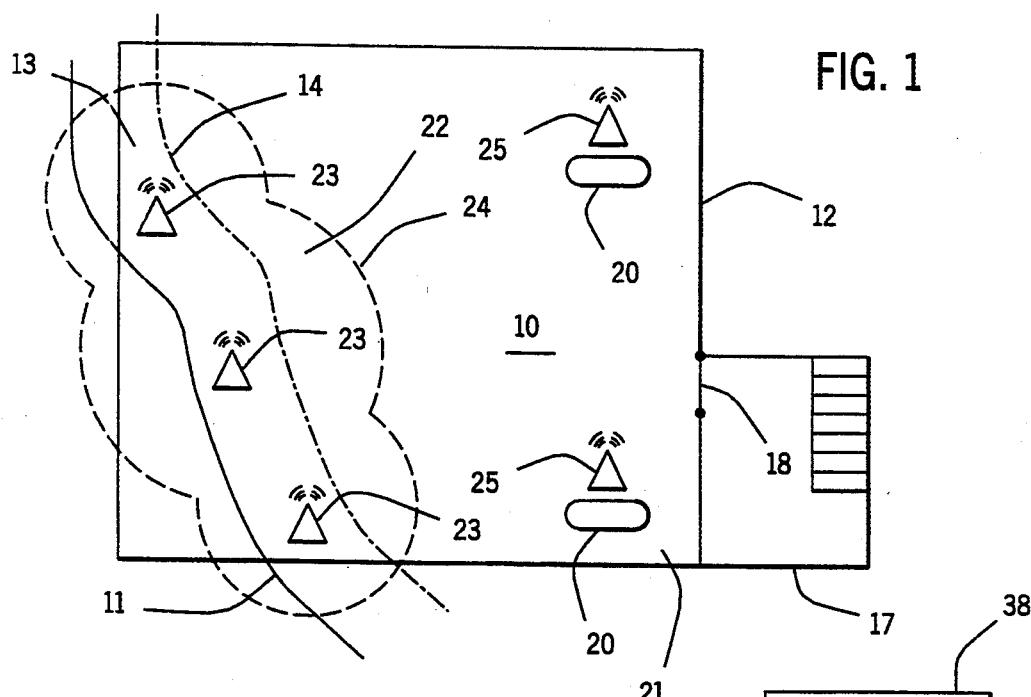
FIG. 1 is a schematic plan view of a pasture depicting a typical system for electronic fenceless control of livestock in a riparian area.

Referring now to the drawings, FIG. 1 schematically illustrates a plan view of a pasture 10 incorporating the fenceless control system of the present invention. Pasture 10 is located adjacent a stream or river 11, and is enclosed on all four sides by wire fencing 12. A riparian area 13 is located adjacent stream 11 and is defined by boundary line 14. Ingress and egress of the livestock between a corral 17 and pasture 10 is provided by gate 18. Stations 20 are provided in pasture 10 to indicate a watering/salt/mineral facility for the animals.

Livestock which are to graze in pasture 10 are herded from corral 17 through gate 18. Due to the adverse impacts of grazing animals in riparian area 13, it is desired to control the animals' grazing by insuring that the animals remain within a grazing zone 21 and excluded from an exclusion zone 22. In order to accomplish this, a series of special stationary field transmitters 23 are installed in the exclusion zone 22. Field transmitters 23 emit a coded signal of desired strength that radiates outwardly to define a signal boundary 24 to separate grazing zone 21 from exclusion zone 22. Also illustrated in FIG. 1 are a plurality of stationary unlock transmitters 25. It should be noted that unlock transmitters 25 are located remote from field transmitters 23, and are advantageously placed adjacent facilities 20.

Figure 2:
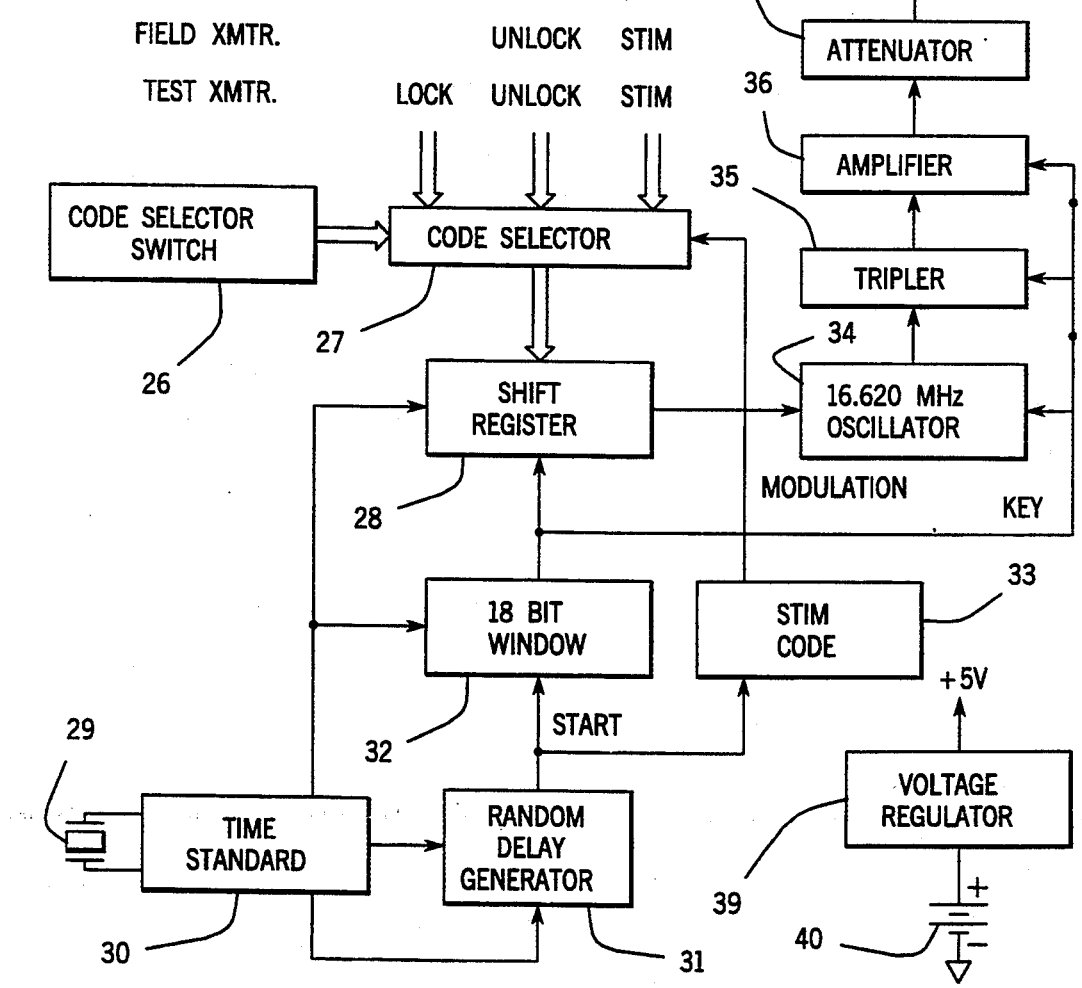
FIG. 2 is a schematic block diagram of a transmitter for the control system of FIG. 1.

Referring now to FIG. 2, the electronic circuitry for field transmitters 23 and unlock transmitters 25 is schematically illustrated therein in block diagram form. With respect to field transmitters 23, a code selector switch 26 controls a code selector 27 that generates a five bit digital stimulate code to a shift register 28. The livestock control field transmitter 23 has a digital transmission window of 94 milliseconds. Twelve stimulant codes that are at least five bits distance from each other as well as from the lock/unlock codes hereinafter to be described have been developed for use in connection with this system. Thus, a receiver code must be erred in at least five bits to be interpreted as another legitimate code.

System timing is derived from a 32768 Hz crystal control clock 29. Clock 29 operates via time standard 30 to generate an output pulse every 94 milliseconds. The output pulse in turn is randomly delayed up to 32 milliseconds in a random delay generator 31. Random delay generator 31 prevents transmitters 23 from interfering with each other and allows the receiver 42 (hereinafter to be described) sleep period to be longer thus reducing the receiver's battery current drain. The output from delay generator 31 enables an 18 bit window 32 to provide a clock signal to shift register 28, and simultaneously activates stimulate code generator 33 which in turn continuously generates the appropriate digital stimulate code to code selector 27 to insure that field transmitter 23 generates a stimulate code every 94 milliseconds.

A 16.620 MHz oscillator 34 is direct frequency modulated by the code output from shift register 28. Deviation is set to $+/-4,000$ Hz. The output from oscillator 34 is then tripled by tripler 35 to 49,860 MHz and amplified by amplifier 36 to the desired power level. A five position attenuator 37 then allows up to 20 dB power control in order to establish the desired detection distance of between 100–500 feet. This signal is then transmitted by an omnidirectional antenna 38 to form the arcuate signal boundary 24. Attenuator 37 thus allows varying the field strength of the generated field. Controlling the field strength thus allows sizing the exclusion area to a particular application. As noted, the present invention provides five different settings, but any number of attenuator positions may be employed to vary the field strength of the generated field. All transmitter circuits are powered from the output of a 5-volt regulator 39 connected to a battery 40. Battery voltages from 5.5 to 15 volts can be utilized.

It should be noted that unlock transmitters 25 function in the identical manner to that illustrated and described in FIG. 2 except that an unlock code is continuously generated rather than a stimulate code. Thus, unlock transmitters 25 create an unlock zone and are employed to reactivate a "locked" ear tag, as will hereinafter be described.

Figure 3:
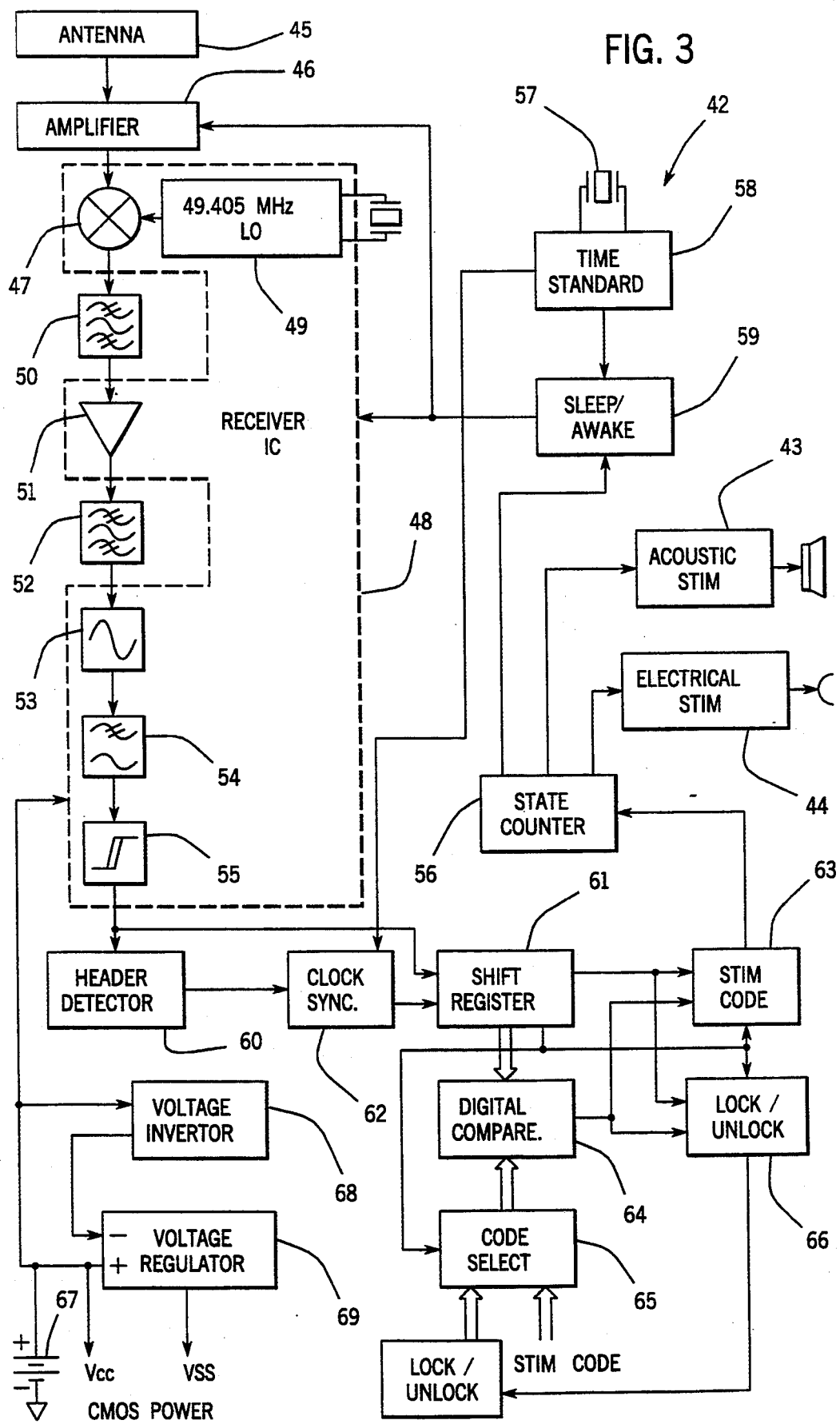
FIG. 3 is a schematic block diagram of a receiver worn by an animal to be controlled by the system of FIG. 1.

FIG. 2 also illustrates in block diagram form the circuitry for a hand held transmitter/receiver unit 76 shown in FIG. 5. Unit 76 can be used by an operator, and enables the operator to lock, unlock and stimulate ear tags, and to test the signal from transmitters 23 and 25. For this purpose, code selector 27 may also generate a lock code which disables the ear tags and prevents continued audio and electrical stimulus to the animal. In addition, the hand held unit 76 enables the rancher to test the signals from transmitters 23 and 25 to insure they are operating properly. For this purpose, each hand held unit 76 includes not only the transmitter circuitry of FIG. 2 but also all the receiver circuitry schematically illustrated in FIG. 3 which is hereinafter to be described. For this purpose the transmitter circuitry of FIG. 2 and receiver circuitry of FIG. 3 are contained within a small housing 77 having a panel 84 mounting three push button switches 78–80 for, respectively, generating a lock, unlock and/or stimulate code. Three indicator lights 81–83, one associated with each button 78–80, alert the user to the function being performed. Similarly, an indicator light 85 mounted in panel 86 indicates when a stimulation code is being received by unit 76. Antenna 87 is attached to housing 77 and is used to transmit and/or receive the codes depending upon the desired function being performed. In addition, switch 26 utilized in connection with the hand held unit 76 is a three position switch having "transmit", "off" and "receive" positions. The "transmit" position enables the hand held unit 76 to transmit the lock, unlock and stimulate codes while the "receive" position enables the hand held unit 76 to test the signals being generated by transmitters 23 and 25.

Referring now to FIGS. 3 and 4, each animal within the grazing zone 21 wears an electronic ear tag 70 containing a receiver 42 (see FIG. 3), an audio warning emitter 43 and an electrical stimulus generator 44 which produces a small electrical stimulus to the animal's ear. Each receiver 42 includes an omnidirectional receiving antenna 45 for receiving the transmitted signal from antenna 38 of transmitters 23 and/or 25. The signal received is amplified in amplifier 46 which applies it to a mixer 47 contained within receiver integrated circuit 48 which is designated as a MC3367DW available from the Motorola Corporation. Integrated circuit 48 essentially converts the analog signal received from antenna 45 and amplifier 46 to a digital signal for further processing. In order to accomplish this, a 49.405 MHz local oscillator 49 injection is also applied to mixer 47 yielding a 455 KHz IF output. The IF signal first passes through a two pole, 15 KHz bandwidth ceramic filter 50 before being amplified by amplifier 51 and is then passed through a second two pole 15 KHz bandwidth ceramic filter 52. The direct FM modulation is then detected in a discriminator 53, the output of which is optimized with a two pole low pass filter 54. Following the low pass filter 54, a data slicer 55 converts the analog signal into a digital signal. Thereafter, all processing is digital.

Whenever a stimulate code is first detected, a state counter 56 outputs a one second enable signal to the audio stimulator 43 which provides an audible alarm tone of about 850 Hz to the animal, and places the receiver 42 in a sleep state for four seconds. System timing is derived from a 32768 Hz crystal controlled clock 57 which operates a time standard 58 for generating a timing pulse to a sleep/awake circuit 59. After the initial four second sleep period, the receiver 42 reawakens and listens for a stimulation code within the following one second period. Should a stimulate code be received within this window, the electrical stimulation via stimulation generator 44 is enabled for one-eighth second and the receiver 42 is once again placed in the sleep state. Should no stimulate code be received within the one second window, the state counter 56 resets and the normal sleep/awake cycle is enabled.

The above cycle is accomplished by applying the digital signal from integrated circuit 48 to a header detector 60 and to a shift register 61. Shift register 61 is enabled after receiving a clock signal from synchronizer 62 to provide a signal to stimulate code generator 63 and to digital comparator 64. Comparator 64 compares the signals received from shift register 61 and code selector 65, and if the codes compared are a match, enables generator 63 which in turn generates the stimulate code to state counter 56 and thence to audio stimulator 43 and/or electrical stimulator 44.

The electrical stimulation consists of high voltage spikes of about 2.5 kilovolts every 30 milliseconds for approximately one-eighth second period. Since it is desired that the animals learn to associate the audio warning with the electrical stimulus, the audio alarm tone must be emitted prior to each electrical stimulus. The audio tone is preferably emitted at a frequency of about 850 Hz. Also, it is desirable for the animal to have sufficient time to react to the audio warning and to an electrical stimulus before another audio warning or electrical stimulus is received. Therefore, the audio/electrical stimulus sequencing is preferably the following: stimulate signal received by ear tag; audio warning; four second delay; electrical stimulus; four second delay; audio warning; four second delay; electrical stimulus; four second delay; audio warning; four second delay; electrical stimulus; four second delay; audio warning; four second delay; electrical stimulus; lock up. If during any of the above sequencing steps the animal moves away from the transmitter signal after an audio warning or electrical stimulus, the receiver 42 resets for a new sequence and no further stimuli are received by the animal.

As noted above, the audio/electrical stimulation cycle repeats for a maximum of about four times, after which the state counter 56 sends a lock signal to the lock/unlock latch 66. The stimulate code decoder 65 is then disabled until such time as an unlock code is received. During normal operation, the receiver 42 is awake for about 250 milliseconds of every second. This reduces the total power consumption almost 4 to 1 since the majority of the power is consumed by the receiver 42.

The RF amplifier 46, receiver integrated circuit 48 and both the audio stimulator 43 and electrical stimulator 44 are all powered directly from a battery 67, preferably comprising two alkaline AAA cells. The digital circuits illustrated in FIG. 3 must have at least three volts DC to function properly, but their power consumption increases rapidly thereafter. Therefore, a voltage inverter 68 provides a negative voltage equal to the voltage of battery 67, and a negative voltage regulator 69 limits the digital circuit supplied to about 3.5 volts DC. Thus, the digital circuits receive their positive supply from battery 67 and their negative supply from voltage regulator 69.

Referring now to FIG. 4, there is illustrated an ear tag 70 for mounting the circuitry of receiver 42. Ear tag 70 includes a flat base or circuit board 71 approximately one-sixteenth inch in thickness. The receiver electronics shown in FIG. 3 is housed within cover 72 while the battery 67 is contained within battery well 73. Antenna 45 is illustrated as a wire extending from the lower edge of ear tag 70. Audio stimulator 43 is mounted near the top of tag 70 to provide closest proximity to the ear canal of the animal. Electrical stimulus is provided by four electrodes 74 (only three of which are shown) that are mounted on an ear tag post or bolt 88. Ear tag 70 is mounted directly through an ear 97 of an animal and is affixed thereto by a bolt 88 which passes through an opening in the top of board 71. Bolt 88 includes opposite threaded ends 89 and 90 and a shank portion (not shown). An insulating sleeve 92 surrounds the shank portion of bolt 88 and is composed of a material such as nylon. Sleeve 92 also includes an integral flange 93 which is sandwiched between a washer 94 and one side of board 71. A nut 95 threaded onto end 89 of bolt 88 mounts the post assembly in place on board 71. Electrodes 74 comprise four longitudinally extending metal contacts imbedded in the outer diameter of sleeve 92 but exposed to the surface thereof. Electrodes 74 are equiangularly spaced about the circumference of sleeve 92, and are connected at their inner ends to electrical stimulation generator 44. A nut 96 threaded onto outer end 90 of bolt 88 and washer 91 mounts ear tag 70 onto the ear 97 of livestock. Thus, upon generation of an electrical stimulus by generator 44, electrodes 74 apply the stimulus to the ear 97 of livestock.

In operation, if an animal ventures within the exclusion zone 22, the signal generated by field transmitters 23 is detected by receiver 42 on ear tag 70 worn by the animal. The signal activates the audio stimulator 43 and electrical stimulator 44, as previously described herein, resulting in an audio warning followed by an electrical stimulation to the ear of the animal. If the animal exits the exclusion zone 22 and moves back into the grazing zone 21, no further stimuli are received. If the animal, however, proceeds toward transmitter 23, the signal from transmitter 23 is again received and the animal is provided with another audio/electrical stimulation. As previously described herein, built-in safety devices lock up receiver 42 after four cycles of audio/electrical stimuli are received. The receiver 42 must then be reactivated by an unlock transmitter 25 or by the hand held transmitter unit 76 previously described herein.

Various modes of carrying out the invention are contemplated as being within the scope of the following claims particularly pointing out and distinctly claiming the subject matter regarded as the invention.

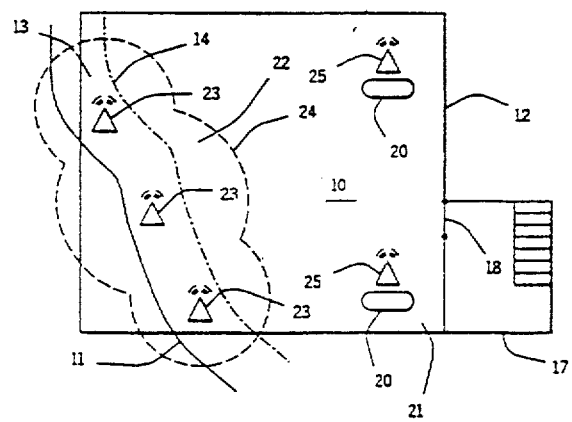

We claim:

1. In an apparatus for fenceless animal control, the combination comprising:
   a field transmitter for generating a stimulation signal having a stimulation code of one of a plurality of predetermined strengths to define one of a corresponding plurality of different exclusion zone areas from which animals are to be excluded;
   a receiver borne by the animal to be controlled for receiving said stimulation signal and generating a control signal output in response thereto if the stimulation code matches a predetermined receiver code;
   a warning device borne by the animal for controlling actions of the animal, said warning device enabled in response to said control signal output; and
   control means communicating with the field transmitter for selecting among the plurality of predetermined strengths of said stimulation signal to thereby vary the area defining said exclusion zone.

2. The apparatus of claim 1 wherein said control means comprises at least one attenuator for controlling the strength of said stimulation signal.

3. In an apparatus for fenceless animal control, the combination comprising:
   a plurality of field transmitters for generating stimulation signals of designated strength to define an exclusion zone area from which animals are to be excluded, each field transmitter including first circuit means for generating a digital code, oscillator means responsive to said digital code for generating one of said stimulation signals, and second circuit means for randomly delaying transmission of said code from said first circuit means to said oscillator means;
   a receiver borne by the animal to be controlled for receiving said stimulation signal and generating a control signal output in response thereto; and
   a warning device borne by the animal for controlling actions of the animal, said warning device enabled in response to said control signal output.

4. The combination of claim 3 wherein said second circuit means includes clock means for generating a timing pulse and random delay generator means for randomly delaying the transmission of said timing pulse to said first circuit means.

5. The combination of claim 3 wherein said timing pulse is generated every 94 milliseconds.

6. In a method of fenceless animal control, the steps of:
   generating a stimulation signal with a field transmitter to define an exclusion zone area from which animals are to be excluded;
   receiving the stimulation signal with a receiver borne by the animal to be controlled to derive a control signal output;
   sequentially enabling animal audio and electrical warning devices borne by the animal in response to the control signal output for a predetermined number of cycles;
   generating a lock signal by said receiver after said predetermined number of cycles for disabling said audio and electrical warning devices; and
   generating an unlock signal for canceling said lock signal with an unlock transmitter so that said warning devices may once again be enabled upon receipt of said stimulation signal.

7. The method of claim 6 wherein said unlock transmitter is located at a location remote from the location of said field transmitter.

8. An ear tag for animals comprising:
   a base;
   electronic receiver circuitry mounted on said base, said circuitry including electrical stimulus generator means for generating an electrical stimulus in response to a desired signal;
   mounting means for mounting said base and circuitry on an ear of an animal the mounting means comprising a post protecting from said base; and
   an electrode disposed on the exterior surface of the post connected to said electrical stimulus generator means and arranged to be in contact with said ear for applying said stimulus to the ear of an animal.

9. An ear tag for animals comprising:
   a base;
   electronic receiver circuitry mounted on said base, said circuitry including electrical stimulus generator means for generating an electrical stimulus in response to a desired signal;
   mounting means for mounting said base and circuitry of an ear of an animal; and
   an electrode on said mounting means connected to said electrical stimulus generator means and arranged to be in contact with said ear for applying said stimulus to the ear of an animal; and
   further including insulating means for insulating said electrode from said mounting means wherein said mounting means comprises a post protecting from said base, and said insulating means comprises a sleeve surrounding said
   wherein said electrode is disposed on the exterior surface of said sleeve and wherein there are a plurality of electrodes circumferentially spaced about the exterior surface of said sleeve.

10. The ear tag of claim 9 wherein each electrode extends longitudinally along said sleeve.

11. In an apparatus for fenceless animal control, the combination comprising:
    a field transmitter for generating a stimulation signal of designated strength to define an exclusion zone area from which an animal is to be excluded;
    a receiver borne by the animal to be controlled for receiving said stimulation signal and generating a control signal output in response thereto;
    a warning device borne by the animal for controlling actions of the animal, said warning device enabled in response to said control signal output; and
    said receiver including means for generating a lock signal for effectively locking the control signal after said warning device is enabled a predetermined number of times and for disabling said warning device; and
    further including a portable transmitter which includes means for generating a lock signal to said receiver.

12. The combination of claim 11 wherein said portable transmitter further includes means for generating an unlock signal for cancelling said lock signal.

13. The combination of claim 12 wherein said portable transmitter further includes means for generating said stimulation signal.

14. The combination of claim 13 wherein said portable transmitter further includes means for detecting the stimulation signal generated by said field transmitter.

* * * * *

UNITED STATES PATENT AND TRADEMARK OFFICE
CERTIFICATE OF CORRECTION

PATENT NO. : 5,408,956
DATED : April 25, 1995
INVENTOR(S) : Thomas M. Quigley et al It is certified that error appears in the above-indentified patent and that said Letters Patent is hereby corrected as shown below:

Title page, should be deleted and substituted with the attached title page.

Signed and Sealed this

Thirteenth Day of June, 1995

Attest:

BRUCE LEHMAN

*Attesting Officer*     *Commissioner of Patents and Trademarks*

United States Patent [19]

Quigley

[11] Patent Number: 5,408,956

[45] Date of Patent: Apr. 25, 1995

[54] METHOD AND APPARATUS FOR CONTROLLING ANIMALS WITH ELECTRONIC FENCING

[75] Inventors: Thomas M. Quigley; Arthur R. Tiedemann; Jack W. Thomas, LA Grande, all of Oreg.

[73] Assignee: The United States of America as represented by the Secretary of Agriculture, Washington, D.C.

[21] Appl. No.: 78,341

[22] Filed: Jun. 21, 1993

[51] Int. Cl.⁶ .................... A01K 15/04; A01K 3/00
[52] U.S. Cl. ............................. 119/720; 119/908
[58] Field of Search ............... 119/718, 719, 720, 721, 119/908; 40/301, 302

[56] References Cited

U.S. PATENT DOCUMENTS

| Re. 31,632 | 7/1984 | Murphy et al. | 40/301 |
|---|---|---|---|
| 700,483 | 5/1902 | Emeis . | |
| 834,587 | 10/1906 | Moyer . | |
| 1,188,910 | 6/1916 | Derrett . | |
| 1,318,909 | 10/1919 | Patterson . | |
| 1,347,868 | 7/1920 | Nichols . | |
| 1,376,223 | 4/1921 | Pannier . | |
| 2,653,400 | 9/1953 | Sutherland . | |
| 2,972,828 | 2/1961 | Dumbreil | 40/302 |
| 3,346,980 | 10/1967 | Wallace | 40/302 |
| 3,357,122 | 12/1967 | Hayes | 40/301 |
| 3,388,492 | 6/1968 | Nichols, Jr. | 40/301 |
| 3,505,752 | 4/1970 | Beattie | 40/302 |
| 3,731,414 | 5/1973 | Murphy et al. | 40/301 |
| 3,949,708 | 5/1976 | Meeks | 119/156 |
| 4,060,921 | 12/1977 | Robinson | 40/301 |
| 4,202,293 | 5/1980 | Gonda et al. . | |
| 4,250,643 | 2/1981 | Mackenzie | 40/301 |
| 4,335,682 | 6/1982 | Gonda et al. . | |
| 4,359,015 | 11/1982 | Ritchey | 40/301 X |
| 4,425,726 | 1/1984 | Dvorak | 40/301 |
| 4,425,874 | 1/1984 | Child | 40/301 X |
| 4,506,630 | 5/1985 | Hair | 119/156 |
| 4,581,834 | 4/1986 | Zatkos et al. | 40/301 |
| 4,694,781 | 4/1987 | Howe et al. | 119/156 |
| 4,741,117 | 5/1988 | Fearing | 40/301 |
| 4,791,402 | 12/1988 | Gonda et al. | 343/895 |
| 4,811,775 | 3/1989 | Sun | 70/16 |
| 4,878,302 | 11/1989 | Jowsey | 40/302 |
| 4,885,855 | 12/1989 | Marks, Sr. et al. | 40/301 |

(List continued on next page.)

FOREIGN PATENT DOCUMENTS 2188028 9/1987 United Kingdom ............... 40/301

OTHER PUBLICATIONS

Fee, Rod, "No Posts, No Wires Electronic Fence," Successful Farming, Mid-Mar., 1993.

(List continued on next page.)

Primary Examiner—Robert P. Swiatek
Attorney, Agent, or Firm—M. Howard Silverstein; John D. Fado; Janet I. Stockhausen

[57] ABSTRACT

An electronic fence is utilized to control animal access as an alternative to conventional posts and barbed wire fences. The electronic fencing includes stationary field transmitters with variable ranges placed around the perimeter of an accessible area. Each animal in the area wears a small ear tag receiver. When an animal enters an exclusion zone, the receiver triggers an audible tone, and then shortly thereafter an electrical stimulus. The audible tones and electrical stimuli may be repeated three more times at four second intervals until the animal exits the exclusion zone. If the animal hasn't responded, a safety device in the ear tag locks up or disables the unit to prevent the animal from receiving further stimuli. A remote stationary unlock transmitter located in areas frequented by the animals, such as salt licks, mineral or water sources, unlocks any ear tags which have become locked and thus improves the integrity of the system. The ear tag may also be locked by a portable hand held transmitter without stimulation to the animal. The hand held transmitter may also be utilized to unlock the ear tags and to test the system by providing an electronic stimulus to the animal for the purpose of moving selected animals through the exclusion zone when desired.

14 Claims, 3 Drawing Sheets